US010882777B2

(12) United States Patent
Faler et al.

(10) Patent No.: US 10,882,777 B2
(45) Date of Patent: Jan. 5, 2021

(54) ADJUSTABLE FUME TUBE BURNER (71) Applicant: Corning Incorporated, Corning, NY (US)

(72) Inventors: James Henry Faler, Wilmington, NC (US); Dale Robert Powers, Painted Post, NY (US); Fei Xia, Pittsford, NY (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 292 days.

(21) Appl. No.: 15/915,695

(22) Filed: Mar. 8, 2018

(65) Prior Publication Data
US 2018/0265394 A1    Sep. 20, 2018

Related U.S. Application Data (60) Provisional application No. 62/472,164, filed on Mar. 16, 2017.

(51) Int. Cl.
*C03B 19/14* (2006.01)
*C03B 37/014* (2006.01)

(52) U.S. Cl.
CPC ...... *C03B 37/0142* (2013.01); *C03B 19/1423* (2013.01); *C03B 2207/06* (2013.01); *C03B 2207/08* (2013.01); *C03B 2207/14* (2013.01); *C03B 2207/20* (2013.01); *C03B 2207/24* (2013.01); *C03B 2207/26* (2013.01); *C03B 2207/36* (2013.01); *C03B 2207/42* (2013.01); *F23D 2900/21005* (2013.01)

(58) Field of Classification Search
CPC ............ C03B 37/0142; C03B 2207/14; C03B 19/1423
See application file for complete search history.

(56) References Cited

U.S. PATENT DOCUMENTS

| 4,428,762 | A | 1/1984 | Andrejco et al. |
| 5,599,371 | A | 2/1997 | Cain et al. |
| 5,788,730 | A * | 8/1998 | Ruppert ............... C03B 19/1423 65/17.4 |
| 5,922,100 | A | 7/1999 | Cain et al. |
| 7,165,425 | B2 | 1/2007 | Uchiyama et al. |
| 9,260,339 | B2 | 2/2016 | Yoshida |
| 2015/0033799 | A1 | 2/2015 | Ishihara et al. |

OTHER PUBLICATIONS

International Search Report and Written Opinion PCT/US2018/022147 dated Jun. 1, 2018.

* cited by examiner

*Primary Examiner* — Cynthia Szewczyk
(74) *Attorney, Agent, or Firm* — Robert L. Carlson (57) ABSTRACT

A method of forming an optical fiber preform includes the steps: igniting a burner having a fume tube assembly to produce a first spray size of silicon dioxide particles; depositing the silicon dioxide particles on a core cane to produce a soot blank; and adjusting an effective diameter of an aperture of the fume tube assembly to produce a second spray size of the silicon dioxide particles. The second spray size is larger than the first spray size.

13 Claims, 5 Drawing Sheets

ADJUSTABLE FUME TUBE BURNER

This application claims the benefit of priority under 35 U.S.C. § 119 of U.S. Provisional Application Ser. No. 62/472,164 filed on Mar. 16, 2017 the content of which is relied upon and incorporated herein by reference in its entirety.

FIELD OF THE DISCLOSURE

The present disclosure generally relates to burners, and more particularly to adjustable fume tubes of silica particle burners.

BACKGROUND

Outside vapor deposition (OVD) processes are used for the production of optical fiber preforms. Certain burners may be able to make one preform blank in a single run. Both soot capture efficiency and laydown rate are important to the overall cost of fiber manufacturing. However, increased laydown rates often have a deleterious effect on the efficiency of the soot capture by the optical fiber preform. Accordingly, new methods and systems of increasing soot capture efficiency and laydown rate may be desirable.

SUMMARY OF THE DISCLOSURE

According to at least one example of the present disclosure, a method of forming an optical fiber preform includes the steps: igniting a burner having a fume tube assembly to produce a first spray size of silicon dioxide particles; depositing the silicon dioxide particles on a core cane to produce a soot blank; and adjusting an effective diameter of an aperture of the fume tube assembly to produce a second spray size of the silicon dioxide particles. The second spray size is larger than the first spray size.

According to another example of the present disclosure, a burner includes a back block and a face block. The face block defines a plurality of gas emitting regions. A fume tube assembly extends through the face block and is surrounded by the gas emitting regions. The fume tube assembly includes a first fume tube coupled to the face block. A second fume tube is positioned within the first tube. An aperture is defined at an end of the fume tube assembly. An actuator is coupled with the second fume tube and configured to move the second fume tube within the first fume tube to adjust an effective diameter of the aperture.

According to another example of the present disclosure, a burner includes a face block defining a plurality of gas emitting regions. A fume tube assembly extends through the face block and is surrounded by the gas emitting regions. The fume tube assembly includes a first fume tube. A second fume tube is movably positioned within the first tube and defines an exterior surface. The exterior surface is tapered. An aperture is defined at an end of the fume tube assembly. An actuator is coupled with the second fume tube and configured to move the second fume tube within the first fume tube to variably adjust an effective diameter of the aperture.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring now to FIGS. 1-5, reference numeral 10 generally designates a burner. The burner 10 includes a back block 14 and a face block 18. The face block 18 defines a plurality of gas emitting regions 22. A fume tube assembly 26 extends through the face block 18 and is surrounded by the gas emitting regions 22. The fume tube assembly 26 includes a first fume tube 30 coupled to the face block 18. A second fume tube 34 is positioned within the first fume tube 30. An aperture 38 is defined at an end of the fume tube assembly 26. An actuator 42 is coupled with the second fume tube 34 and configured to move the second fume tube 34 within the first fume tube 32 to adjust an effective diameter of the aperture 38.

Figure 1:
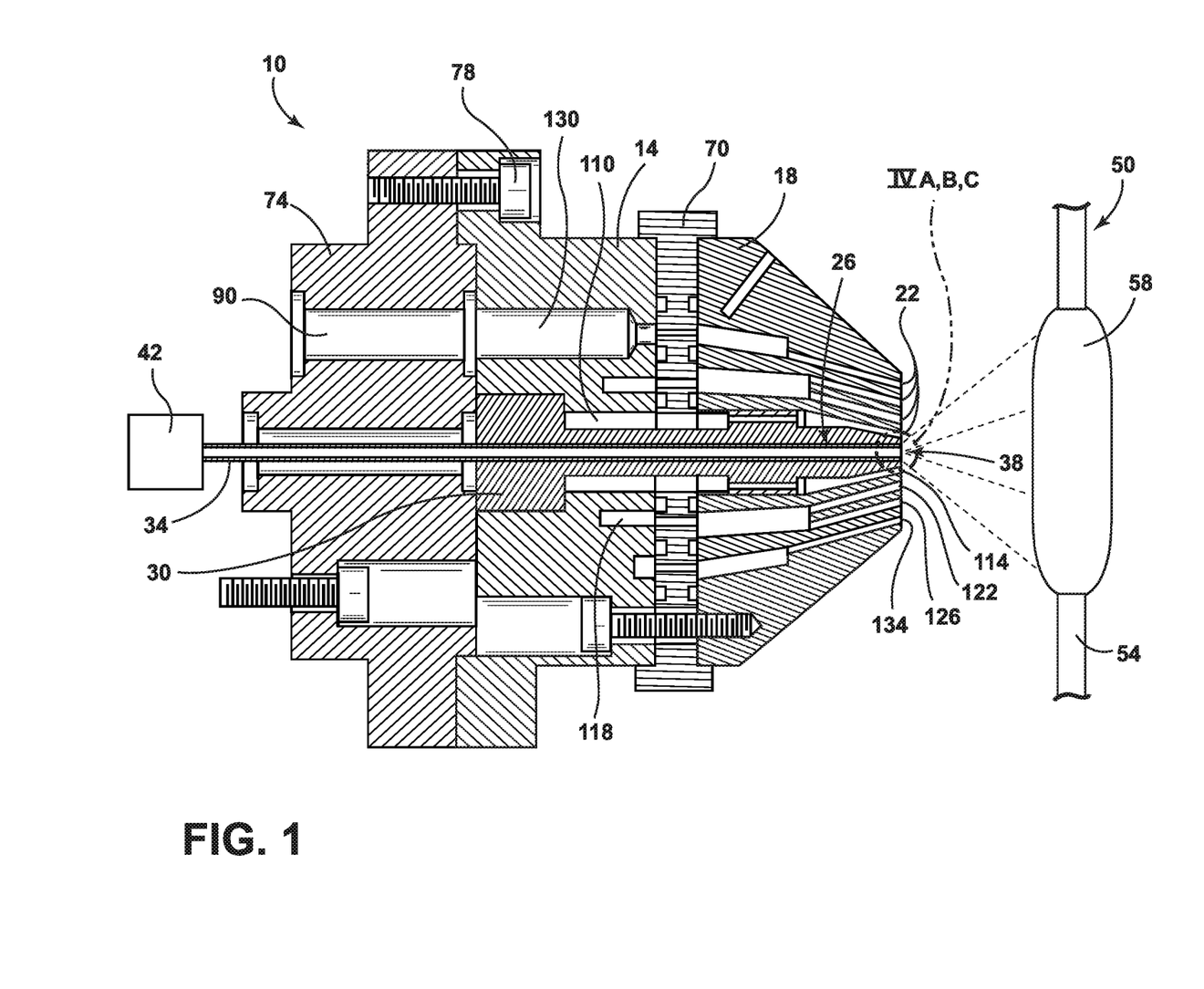
FIG. 1 is a cross-sectional view of a burner, according to at least one example.

Referring now to FIG. 1, the burner 10 may be used in the formation of core soot preforms, optical fiber preforms 50 and/or for the production of silicon dioxide, or silica, particles (e.g., soot). Further, the burner 10 may be used to provide an overclad layer to a core. The silica soot produced by the burner 10 may include one or more dopants such as $GeO_2$, $TiO_2$, $B_2O_3$, $Al_2O_3$, $P_2O_5$ and the like. In core soot preform examples, soot produced by the burner 10 may be applied to a bait rod to form a core soot blank around the bait rod. In optical fiber preform 50 examples, the preform 50 includes a core cane 54 and a soot blank 58. The core cane 54 may be composed of a consolidated glass (e.g., a germanium doped core soot preform consolidated into void-free glass) and/or other transparent materials. The soot blank 58 is positioned and surrounds the core cane 54. The soot blank 58 is composed of silica soot which is produced by the burner 10. According to various examples, the soot blank 58 may be a plurality of silica particles. The soot blank 58 may include one or more dopants for affecting the optical properties of optical fibers produced from the optical fiber preform 50. The silica soot may be applied to the core cane 54 and the soot blank 58 from the burner 10 via outside vapor deposition which may otherwise be referred to herein as spraying or a laydown process. The optical fiber preform 50 may be rotated while the silica soot from the burner 10 is sprayed onto the core cane 54 and/or soot blank 58. The optical fiber preform 50 may be consolidated once the soot blank 58 has reached a predetermined size and an optical fiber drawn therefrom.

The soot blank 58 of the optical fiber preform 50 grows (e.g., in thickness and diameter) with time as silica soot from the burner 10 is deposited thereon. In other words, the target (e.g., the soot blank 58) of the burner 10 grows in size with time. For example, the optical fiber preform 50 may grow from about 20 mm in diameter (e.g., essentially the diameter of the core cane 54) to about 300 mm in size (e.g., the diameter of the core cane 54 and soot blank 58) over the course of the deposition or laydown process. As such, deposition of the silica soot onto the optical fiber preform 50 may be broken into a plurality of stages. According to at least one example, the deposition of the silica soot from the burner 10 onto the optical fiber preform 50 may be broken into an early-stage, a transition stage, and a late stage.

In the early stage, the optical fiber preform 50 may provide a small target area (e.g., just the core cane 54) for the burner 10 and as such a first spray size of the silica soot particles from the burner 10 may be small. The first spray size may have a diameter of from about 0.5 cm to about 2.4 cm, or from about 0.8 cm to about 2.0 cm at from about 8 cm to about 10 cm from the aperture 38 of the fume tube assembly 26. In a specific example, the first spray size may have a diameter of about 1.2 cm at about 9 cm from the aperture. The spray size of the burner 10 may remain constant at the first spray size during the early stage. Keeping the first spray size of the burner 10 small while the optical fiber preform 50 is small in the early stage may be advantageous in increasing the soot capture, or efficiency, of the burner 10. For example, a smaller spray size may ensure that a greater quantity of the silica soot is captured by the preform 50 and does not merely pass by the preform 50. The early-stage of the laydown process may encompass the first 40 minutes, 50 minutes, 60 minutes, 70 minutes, 80 minutes, 90 minutes, 100 minutes, 110 minutes, 120 minutes or 130 minutes of the deposition process. It will be understood that the size of the optical fiber preform 50 at the end of the early-stage may vary from process to process and may be dependent on factors such as size of the burner 10, desired size of the soot blank 58 and/or overall size of the optical preform 50.

As the optical fiber preform 50 grows in size, the laydown process may change to the transition state. In the transition state, the effective diameter of the aperture 38 of the fume tube assembly 26 may be adjusted and/or increased as explained in greater detail below. The increased effective diameter of the aperture 38 may provide a second spray size of the silica soot particles toward the optical fiber preform 50. According to various examples, the second spray size may be larger (e.g., wider, taller, and/or thicker) than the first spray size. For example, the second spray size may have a diameter of from about 1.0 cm to about 3.0 cm, or from about 1.2 cm to about 1.8 cm at from about 8 cm to about 10 cm from the aperture 38 of the fume tube assembly 26. In a specific example, the second spray size may have a diameter of about 1.5 cm at about 9 cm from the aperture. Although described as a stage, it will be understood that the transitional stage and the adjusting of the effective diameter of the aperture 38 may take place instantaneously or gradually over a period of time (e.g., greater than or equal to about one second, one minute, or greater than or equal to about 10 minutes).

The late stage state of the deposition process may take place once the optical fiber preform 50 reaches a predetermined thickness or deposition time. The late stage state of the deposition process may begin at about 40 minutes, 50 minutes, 60 minutes, 70 minutes, 80 minutes, 90 minutes, 100 minutes, 110 minutes, 120 minutes, 130 minutes into the laydown process and extend to the end of the process run. The spray size of the burner 10 may remain constant at the second spray size during the late stage. During the late stage state of the laydown process, the second spray size, which is larger than the first spray size, may facilitate a higher deposition rate of the silica soot onto the soot blank 58 while maintaining a desired level of silica soot capture (e.g., a desired level of efficiency). In other words, as the thickness of the soot blank 58 increases, it is able to accommodate the larger second spray size. As such, the silica soot from the burner 10 may be applied with a higher deposition rate. The amount of gas emitted from the gas emitting regions 22 of the burner 10, as well as the amount of silica soot produced by the fume tube assembly 26, may be increased in the late stage.

It will be understood that other examples of the laydown process may be implemented. For example, the laydown process may be divided into less than or greater than three stages. For example, when the fume tube assembly 26 includes greater than two fume tubes, the laydown process may include an additional transition stage and an intermediate stage between the transition stages. In examples of the burner 10 where the effective diameter of the aperture 38 may be smoothly transitioned over a majority or the entirety of the laydown process, the laydown process may effectively be a single transition stage, or the transition stage may extend over a large portion (e.g., greater than or equal to about 30 min) of the laydown process with an early stage and a late stage on either side of the transition stage.

Division of the deposition process into the early-stage, transition stage and late stage, and the adjusting of the effective diameter of the aperture 38 may not only be advantageous in increasing the capture efficiency of the silica soot by the optical fiber preform 50, but may also be advantageous in increasing the rate at which the silica soot particles are adhered to the optical fiber preform 50 (e.g., thereby shortening manufacturing time).

Still referring to FIG. 1, the burner 10 may be positioned within one or more housings which aid in generally directing the silica soot toward the optical fiber preform 50. The burner 10 has five main components: the face block 18, a manifold plate 70, the back block 14, the fume tube assembly 26, and a burner mounting block 74. The face block 18, the manifold plate 70, the back block 14, the fume tube assembly 26, and the burner mounting block 74 may be composed of a metal, a polymer, a ceramic or combinations thereof. Examples of suitable metals may include aluminum, stainless steel and other metals which can be readily machined. It will be understood that the face block 18, the manifold plate 70, the back block 14, the fume tube assembly 26, and the burner mounting block 74 may each be made of the same material or a different material.

In use, the face block 18, manifold plate 70, back block 14 and fume tube assembly 26 are assembled as described below to form a subassembly which is mounted to the burner mounting block 74 through bolts 78. The actuator 42 is positioned rearward of the burner 10, and coupled to the second fume tube 34. It will be understood that the actuator 42 may be coupled to the burner mounting block 74 without departing from the disclosure provided herein. The actuator 42 is configured to move the second fume tube 34 coaxially within the first fume tube 30. Additionally or alternatively, the actuator 42 may be coupled with the first fume tube 30 such that the first fume tube 30 may move relative to the second fume tube 34. Further, the actuator 42 may be configured to function as a gas supply to the first and/or second fume tubes 30, 34 as explained in greater detail below. The fume tube assembly 26 may be press fit into back block 14. In this way, a precision alignment is achieved between the fume tube assembly 26 and the back block 14. The face block 18 of the burner 10 has a sliding fit over fume tube assembly 26 which provides alignment, as well as easy disassembly, of these components. In other words, the fume tube assembly 26 is extending through the face block 18.

During operation, the burner 10 is configured to emit a plurality of gasses. Some of the gasses may be shield gasses while other gasses are burned to aid in the production of the silica soot. The gas pumped through the first and/or second fume tubes 30, 34 of the fume tube assembly 26 is a fumed, or vaporized, silicon tetrachloride (Siltet) and/or octamethylcyclotetrasiloxane (OMCTS) and $O_2$ mixture. Although disclosed in connection with Siltet and OMCTS, it will be understood that the any silica producing compound may be provided through the fume tube assembly 26. For example, tetraorthosilicate (TEOS) may also be provided through the fume tube assembly 26. As explained above, the actuator 42 may be the source of the Siltet and/or OMCTS and/or the $O_2$. In the depicted example, the Siltet and/or OMCTS and $O_2$ enter the burner 10 through the fume tube assembly 26, and ultimately exits the fume tube assembly 26 through the aperture 38. It will be understood that the fume tube assembly 26 may also include one or more inert gasses (e.g., $N_2$) in addition to the Siltet and/or OMCTS and $O_2$ without departing from the teachings provided herein. The burner 10 may have a flow rate of Siltet and/or OMCTS of from about 6 grams per minute to about 25 grams per minute, or from about 10 grams per minute to about 15 grams per minute. In a specific example, the flow rate of Siltet and/or OMCTS may be about 12.5 grams per minute. The flow rate of the $O_2$ through the fume tube assembly 26 may be from about 1 slpm to about 10 slpm, or from about 2.5 slpm to about 8 slpm. In a specific example, the flow rate of $O_2$ through the fume tube assembly 26 may be about 5.5 slpm.

Gas receiving apertures 90 of the back block 74 mate with gas supply lines and gas tight fittings to receive a $CH_4$ and $O_2$ premix. The $CH_4$ and $O_2$ premix enters the burner mounting block 74, proceeds through a gas passage 130 in the back block 14, passes through pressure equalizing orifices of manifold plate 70, and ultimately exits the burner's face through a gas burner region 134. The burner 10 may have a flow rate of $CH_4$ of from about 1 slpm to about 7 slpm, or from about 2 slpm to about 5 slpm. In a specific example, the flow rate of $CH_4$ may be about 3.5 slpm. The burner 10 may have a flow rate of premix $O_2$ of from about 1 slpm to about 7 slpm, or from about 2 slpm to about 5 slpm. In a specific example, the flow rate of $O_2$ may be about 2.8 slpm. The $CH_4$ and $O_2$ premix may be ignited and burned to provide heat which combusts the OMCTS and $O_2$ mixture to produce the silica soot. The combustion of the OMCTS and $O_2$, along with the shield gasses, propels the silica soot toward the optical fiber preform 50.

Inert gas receiving apertures receive an innershield $N_2$. The innershield $N_2$ enters burner mounting block 74 through a gas receiving aperture, proceeds through a gas passage in the back block 74, enters a central aperture 110, passes through an integral inner shield manifold of the manifold plate 70, and ultimately exits a face of the burner 10 through inner shield region 114. The burner 10 may have an innershield $N_2$ flow rate of from about 1 slpm to about 7 slpm, or from about 2 slpm to about 5 slpm. In a specific example, the burner 10 may have an innershield $N_2$ flow rate of about 3.2 slpm.

Outershield $O_2$ enters the burner mounting block 74, proceeds through a gas passage and into an inner annulus 118, passes through a pressure equalizing orifice of the manifold plate 70, and ultimately exits a face of the burner 10 through outershield regions 122 and 126. The burner 10 may have an outer shield $O_2$ flow rate of from about 4 slpm to about 20 slpm, or from about 6 slpm to about 13 slpm. In a specific example, the outer shield $O_2$ flow rate may be about 9.9 slpm. As such, the outershield regions 122 and 126, inner shield region 114 and the gas burner region 134 may correspond to the gas emitting regions 22.

Figure 2A:
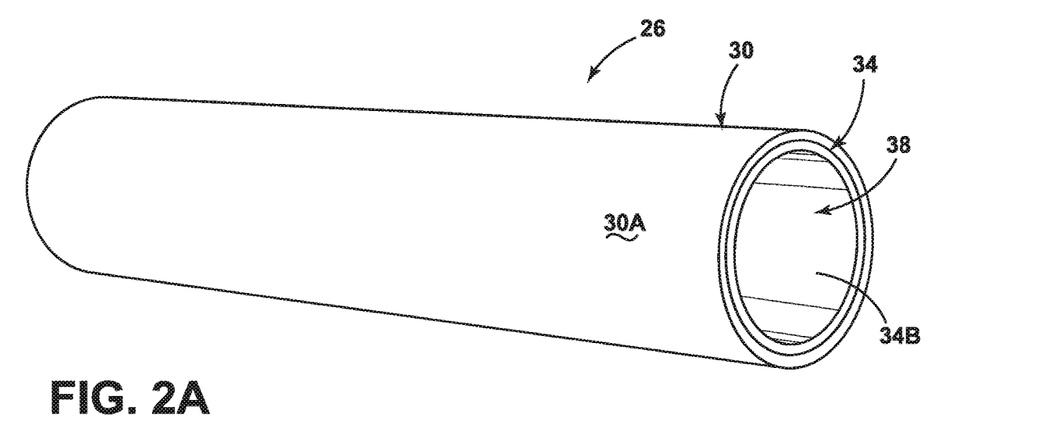
FIG. 2A is a perspective view of a fume tube assembly removed from a burner, according to at least one example.
Figure 2B:
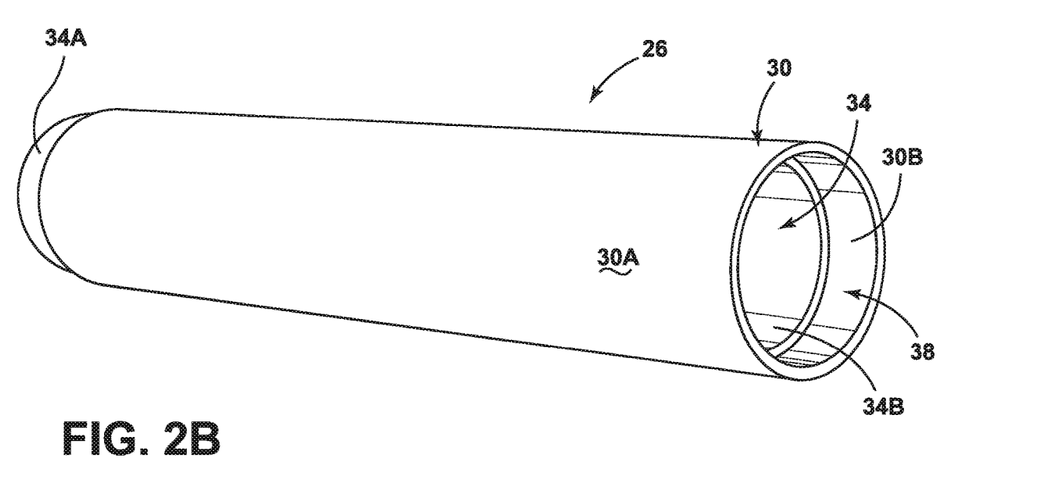
FIG. 2B is a perspective view of the fume tube assembly of FIG. 2A in a different state.

Referring now to the example depicted in FIGS. 2A and 2B, the fume tube assembly 26 includes both the first fume tube 30 and the second fume tube 34. The first fume tube 30 defines a first exterior surface 30A and a first interior surface 30B. The second fume tube 34 defines a second exterior surface 34A and a second interior surface 34B. The second exterior surface 34A of the second fume tube 34 is slidably coupled to the first interior surface 30B of the first fume tube 30. It will be understood that the slidably coupled interface between the second exterior surface 34A and the first interior surface 30B may allow the first and second fume tubes 30, 34 to coaxially move relative to one another. For example, as explained above, the actuator 42 (FIG. 1) may be configured to move the first and/or second fume tubes 30, 34 relative to one another. For ease of explanation, the second fume tube 34 may be described as the movable component, or movable relative to the first fume tube 30, but it will be understood that the first and/or second fume tubes 30, 34 may be moved relative to one another without departing from the disclosure provided herein.

The first and second fume tubes 30, 34 may be made from a metal, a ceramic and/or combinations thereof. In metal examples, the metal may be a stainless steel (e.g., 303 stainless steel) and/or tungsten carbide (e.g., a composite material composed of tungsten carbide ceramics disposed within a cobalt matrix). Examples where the first and second fume tubes 30, 34 are composed of a hard metal and/or ceramic may be advantageous not only in providing scratch resistance, but also in allowing the precise formation of the first and second fume tubes 30, 34.

An inside diameter of the first fume tube 30 may be from about 1 mm (0.04 inches) to about 4 mm (0.16 inches), or from about 2 mm (0.08 inches) to about 3 mm (0.12 inches). An inside diameter of the second fume tube 34 may be from about 0.5 mm (0.02 inches) to about 5.5 mm (0.22 inches), or from about 2.0 mm (0.06 inches) to about 2.8 mm (0.11 inches). It will be understood that the inside diameter of the first and second fume tubes 30, 34 may take any of the values between the disclosed ranges. According to various examples, the outer diameter (e.g., the second exterior surface 34A) of the second fume tube 34 may be substantially, or approximately, equal to, that of the inside diameter (e.g., the first interior surface 30B) of the first fume tube 30 such that no gap exists between the first and second fume tubes 30, 34. It will be understood that a gap may be defined between the first and second fume tubes 30, 34 without departing from the teachings provided herein.

The aperture 38 is defined at an end of the fume tube assembly 26 and has an effective diameter. The effective diameter of the aperture 38 is the diameter of the fume tube assembly 26 through which the Siltet and/or OMCTS and $O_2$ may exit. The effective diameter of the aperture 38 may correspond to an inner diameter of one of the fume tubes of the fume tube assembly 26 in some examples (e.g., FIGS. 2A-3), or may correspond to an intermediate value between the inner diameters of the fume tubes of the fume tube assembly 26 (e.g., FIGS. 4A-4C). As will be explained in greater detail below, the effective diameter of the aperture 38 may be adjusted to allow for a change in the spray size of silica soot particles which are produced by the burner 10. For example, a smaller effective diameter may produce the relatively smaller first spray size and a larger effective diameter may produce the relatively larger second spray size. The effective diameter of the aperture 38 may be governed by the positioning of the first and second fume tubes 30, 34. For example, the effective diameter of the aperture 38 may become the inside diameter of the first or second fume tubes 30, 34 depending on the relative positioning of the first and second fume tubes 30, 34. Accordingly, using the actuator 42 to move the first and/or second fume tubes 30, 34 relative to one another adjusts the effective diameter of the aperture 38. In a first example, the aperture 38 may have an effective diameter substantially equal to the inside diameter of the second fume tube 34 when the ends of the first and second fume tubes 30, 34 are substantially flush with one another. In a second example, the aperture 38 may have an effective diameter substantially equal to the inside diameter of the first fume tube 30 when an end of the second fume tube 34 is retracted into the first fume tube 30, or position rearwardly of an end of the first fume tube 30. The end of the second fume tube 34 may be positioned rearwardly of the end of the first fume tube 30 by from about 2.0 mm to about 10.0 mm or from about 4 mm to about 6 mm inward from the aperture 38. In other words, the fume tube assembly 26 may have a stepped appearance when the second fume tube 34 is retracted into the first fume tube 30.

Positioning of the first and second fume tubes 30, 34 to adjust the effective diameter of the aperture 38 may be advantageous in adjusting the spray size of the burner 10 based on the stage at which the silica soot laydown process is at. For example, during the early stage, when the relatively smaller first spray size is desirable, the ends of the first and second fume tubes 30, 34 may be substantially flush with one another such that the effective diameter of the aperture 38 is narrow (e.g., the diameter of the second fume tube 34). During the transitional stage, the actuator 42 may move the first and/or second fume tubes 30, 34 such that the effective diameter of the aperture 38 is substantially that of the inside diameter of the first tube 30. As such, the effective diameter of the aperture 38 is increased to produce the relatively larger second spray size which may be desirable for the late stage of the laydown process.

Figure 3:
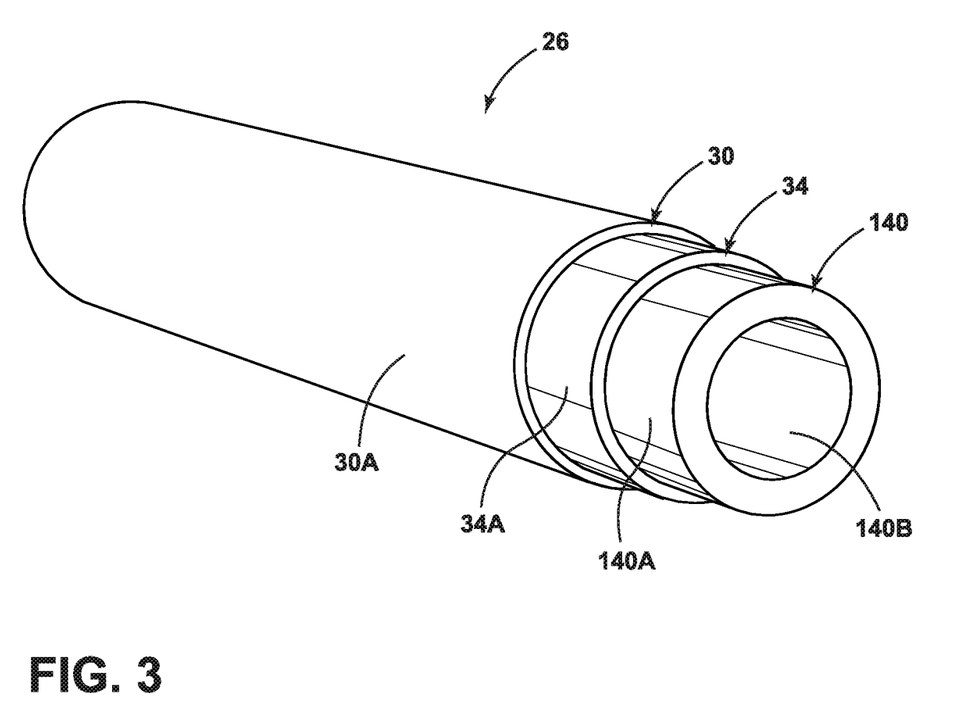
FIG. 3 is a perspective view of a fume tube assembly removed from the burner, according to at least one example.

Referring now to FIG. 3, the depicted example of the fume tube assembly 26 includes a third fume tube 140. The third fume tube 140 may define a third exterior surface 140A and a third interior surface 140B. The third exterior surface 140A may be slidably coupled with the second interior surface 34B of the second fume tube 34. The third fume tube 140 may be composed of substantially the same materials as the first and second fume tubes 30, 34 or may be composed of a different material. An inside diameter of the third fume tube 140 may be from about 0.1 mm to about 4 mm, or may be from about 0.5 mm to about 3 mm.

Similarly to the example depicted in FIGS. 2A and 2B, the third tube 140 may be coupled to the actuator 42 (FIG. 1) and configured to move coaxially with the first and second fume tubes 30, 34. Movement of the third fume tube 140 may change the effective diameter of the aperture 38 in a substantially similar manner to that described in connection with the example of FIGS. 2A and 2B. For example, when the ends of the first, second and third fume tubes 30, 34, 140 are substantially flush with one another, the effective diameter of the aperture 38 may be substantially equal to that of the inside diameter of the third fume tube 140. As the first, second and/or third fume tubes 30, 34, 140 move coaxially relative to one another, the effective diameter of the aperture 38 may be changed (e.g., increase and/or decrease).

Use of the third fume tube 140 may be advantageous in increasing the efficiency of the silica set laydown process as compared to use of only the first and second fume tubes 30, 34. For example, use of the third fume tube 140 may allow the silica set laydown process to be broken into a greater number of stages (e.g., an additional laydown stage and an additional transitional stage) which may increase the capture efficiency of the silica set laydown process. For example, in the early stage the first, second and third fume tubes 30, 34, 140 may be substantially flush with one another such that the effective diameter the aperture 38 is that of the third fume tube 140 and thereby produces the relatively smaller first spray size. A transitional stage may exist where the third fume tube 140 is retracted into the fume tube assembly 26 to create a stepped region similar to that described above in connection with the first and second fume tubes 30, 34. This may allow an intermediate laydown stage where the effective diameter of the aperture 38 is substantially equal to that of the second fume tube 34 which may provide an intermediate spray size. Next, a second transition stage may occur where the second fume tube 34 is retracted into the first fume tube 30 such that the effective diameter of the aperture 38 is changed to that of the inside diameter of the first fume tube 30 thereby producing the relatively larger second spray size. With the increased number of spray sizes afforded by the third fume tube 140, the resulting spray size of the burner 10 may be more accurately tailored to the size of the optical fiber preform 50 which may increase the capture rate, or efficiency, of the burner 10.

Figure 4A:
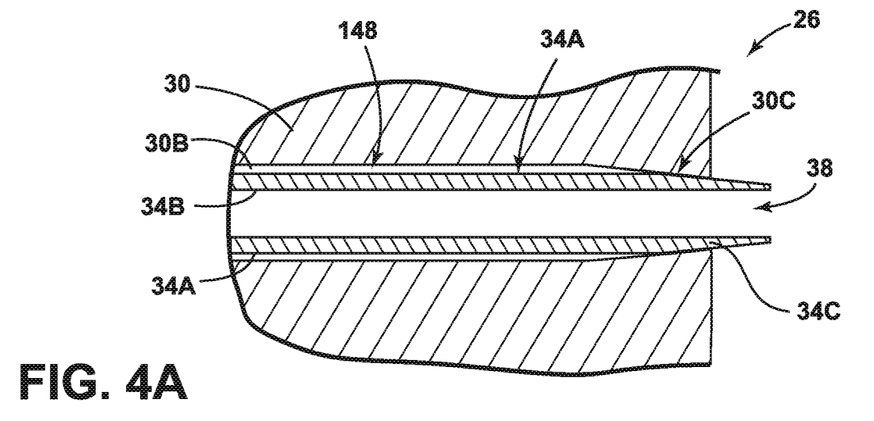
FIG. 4A is an enhanced view of section IVA of FIG. 1, according to at least one example.
Figure 4B:
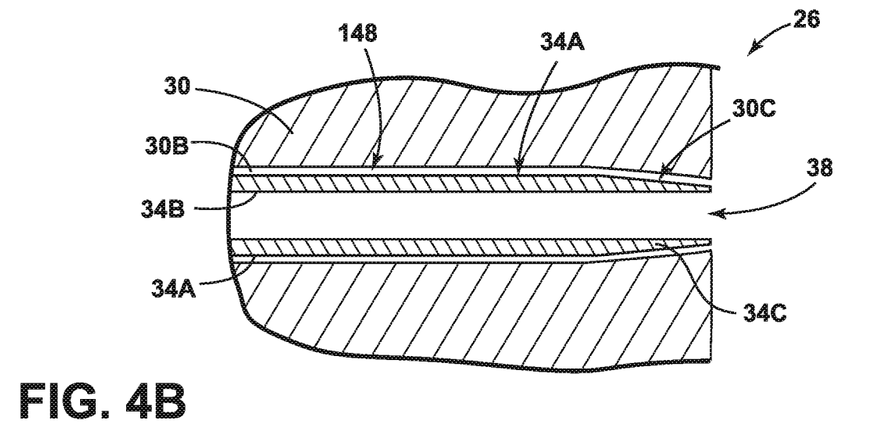
FIG. 4B is an enhanced view of section IVB of FIG. 1, according to at least one example.
Figure 4C:
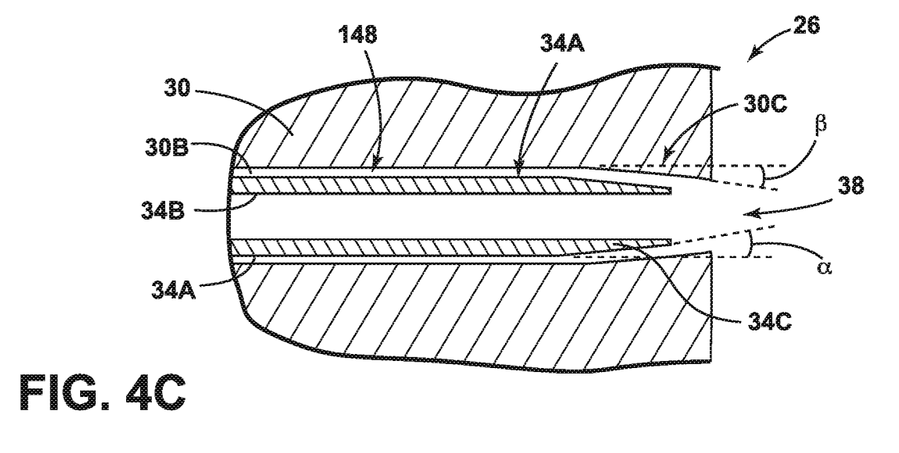
FIG. 4C is an enhanced view of section IVC of FIG. 1, according to at least one example.

Referring now to the depicted example of FIGS. 4A-C, the second tube 34 is coaxially positioned within the first tube 30 to define a gap 148. In other words, the exterior surface 34A of the second tube 34 may have a smaller outside diameter than the inside diameter of the first tube 30. Similar to other examples, the first and second fume tubes 30, 34 are coaxially movable relative to one another. For example, the actuator 42 may be configured to move the first and second fume tubes 30, 34 coaxially relative to the first fume tube 30. It will be understood that the actuator 42 (FIG. 1) may further be configured to move the first and second fume tubes 30, 34 in a translational manner in such an example. As will be explained in greater detail below, movement of the first and second fume tubes 30, 34 relative to one another may adjust the effective diameter of the aperture 38 by decoupling the first and second fume tubes 30, 34 from one another.

In the depicted example, the first fume tube 30 defines a first tapered region 30C and the second fume tube 34 defines a second tapered region 34C. The first tapered region 30C may be tapered in a radially inward direction toward a center axis of the first fume tube 30 such that an inner diameter of the first tube 30 is smaller proximate the aperture 38 relative to an inner diameter over the rest of the first tube 30. The first tapered region 30C may be tapered at an angle β. The angle β may be less than or equal to about 10°, 9°, 8°, 7°, 6°, 5°, 4°, 3°, 2° or less than or equal to about 1°. The second tapered region 34C may be tapered in a radially inward direction, similar to that of the first tapered region 30C, such that an outer diameter of the second fume tube 34 is smaller proximate the aperture 38 than an outside diameter of the rest of the second fume tube 34. The second tapered region 34C may be tapered at an angle α. The angle α may be less than or equal to about 10°, 9°, 8°, 7°, 6°, 5°, 4°, 3°, 2°, or less than or equal to about 1°. According to various examples, the angles α and β may be complementary to one another such that the first tapered region 30C flushly engages, or couples, the second tapered region 34C of the second fume tube 34.

Similarly to the depicted examples of FIGS. 2A, 2B and 3, the aperture 38 is defined proximate the end of the fume tube assembly 26. In the depicted example of FIGS. 4A-C, however, the aperture 38 may extend beyond the end of the first fume tube 30. In other words, where the second tapered region 34C of the second fume tube 34 extends beyond the end of the first fume tube 30, the aperture 38 may be solely defined by the second fume tube 34 (e.g., the effective diameter of the aperture 38 would be the inside diameter of the second fume tube 34). In the depicted example, the Siltet and/or OMCTS and $O_2$ travel through both the second tube 34 as well as within the gap 148 defined within the first tube 30. By decoupling the second tapered region 34C from the first tapered region 30C the gap 148 may extend between the first and second tapered regions 30C, 34C and allow the Siltet and/or OMCTS and $O_2$ present within the gap 148 to exit the fume tube assembly 26 proximate the aperture 38. Further retraction of the second fume tube 34 into the first fume tube 30 may increase the size of the gap 148 between the first and second tapered regions 30C, 34C, which may allow an increased amount of Siltet and/or OMCTS and $O_2$ to escape proximate the aperture 38. Accordingly, moving the first and second fume tubes 30, 34 relative to one another may adjust the amount of Siltet and/or OMCTS and $O_2$ which is allowed to exit, thereby variably adjusting the effective diameter of the aperture 38.

In an exemplary operation (e.g., soot laydown process) of the presently depicted fume tube assembly 26, the fume tube assembly 26 may begin (e.g., an early stage of the laydown process) in the configuration depicted in FIG. 4A. In the depicted stage, the first and second tapered regions 30C, 34C are coupled to one another, and the second tube 34 extends beyond the first tube 30. In such a configuration, the effective diameter of the aperture 38 is that of the inside diameter of the second tube 34. As the inside diameter of the second fume tube 34 is smaller than the inside diameter of the first tube 30 at the first tapered region 30C, the depicted configuration may offer the relatively smaller first spray size. Using the actuator 42, the first and/or second fume tubes 30, 34 may be moved (e.g., coaxially) relative to one another such that the end of the second fume tube 34 is positioned flush with the end of the first fume tube 30 (e.g., as shown in FIG. 4B). As the second fume tube 34 is retracted into the first fume tube 30, the first and second tapered regions 30C, 34C decouple and allow gas (e.g., OMCTS and $O_2$) present in the fume tube assembly 26 to begin passing through the gap 148 between the first and second tapered regions 30C, 34C. Gasses exiting the gap 148 and passing by the first and second tapered regions 30C, 34C may cling, or follow, the exterior surface of the second tapered region 34C which results in a larger effective diameter of the aperture 38. Such a clinging of the gas to the second tapered region 34C may be known as a "wall effect." As the second fume tube 34 is retracted to the configuration depicted in FIG. 4B, the effective diameter of the aperture 38 is proportionally increased as more gas exits the gap 148, and less gas clings to the exterior surface of the second tapered region 34C. As the second fume tube 34 continues to be retracted into the first fume tube 30 to ultimately reach the configuration depicted in FIG. 4C, the effective diameter of the aperture 38 grows to substantially the size of the inner diameter of the first fume tube 30 at the first tapered region 30C.

Use of the example of the fume tube assembly 26 depicted in FIGS. 4A-C may be advantageous in providing a smooth, or gradual, transition for increasing and/or decreasing the effective diameter of the aperture 38 over the course of the silica soot laydown process. For example, during the early stage, the first and second tapered regions 30C, 34C of the first and second fume tubes 30, 34 may be coupled such that the effective diameter of the aperture 38 is that of the inside diameter of the second fume tube 34. As the soot blank 58 of the optical fiber preform 50 grows in size, the second fume tube 34 may be retracted into the first fume tube 30 such that gas is allowed to pass through the gap 148 and increase the effective diameter of the aperture 38. The smooth transition of the second fume tube 34 into the first fume tube 30 may allow for an even and homogenous increasing in the effective diameter of the aperture 38 as the soot blank 58 of the optical fiber preform 50 grows in size. In other words, while the fume tube assembly 26 is in the depicted configuration of FIG. 4A, the effective diameter of the aperture 38 may be small (i.e., the early stage) such that the first spray size may be achieved and as the optical fiber preform 50 grows in size, the effective diameter of the aperture 38 may be proportionally increased until finally the second tapered region 34C is positioned rearward of the first tapered region 30C and the effective diameter of the aperture 38 is that of the first fume tube 30 to create the second spray size (i.e., the late stage depicted in FIG. 4C). As the effective diameter of the aperture 38, and thereby the spray size of the silica soot, may be more closely tied to the present size of the soot blank 58, a greater capture efficiency may be achieved using the example depicted in FIGS. 4A-C.

Figure 5:
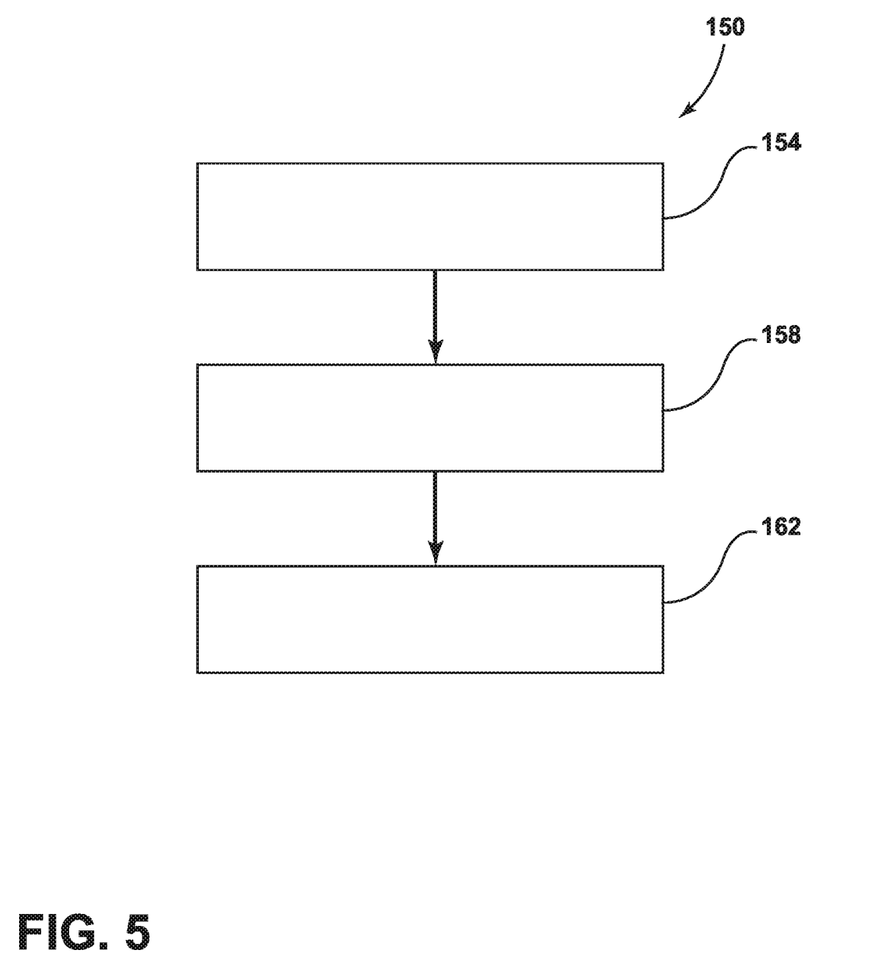
FIG. 5 is a flow diagram of operating the burner, according to at least one example.

Referring now to FIG. 5, a method 150 of operating the burner 10 is disclosed. The method 150 may begin with step 154 of igniting a burner having a fume tube assembly 26 to produce a first spray size of silicon dioxide particles. As explained above, the first spray size of the silica particles may be produced while the optical fiber preform 50 is in the early stage of formation. The ignition of the burner 10 may correspond to the ignition of the $CH_4$ and $O_2$ mixture, or to the burning of the OMCTS and $O_2$. Next, a step 158 of depositing the silicon dioxide particles on the core cane 54 to produce the soot blank 58 is performed. The silica particles attach to the core cane 54 and slowly build up to form the soot blank 58. Next, a step 162 of adjusting the effective diameter of the aperture 38 of the fume tube assembly 26 to produce the second spray size of the silicon dioxide particles may be performed. As explained above, the second spray size may be larger than the first spray size. It will be understood that the step of adjusting the effective diameter of the aperture 38 is performed while depositing the silicon dioxide particles. In other words, the burner 10 may not need to be turned off, or otherwise stopped, to adjust the effective diameter of the aperture 38. The adjustment of the effective diameter of the aperture 38 may be accomplished by moving the first and/or second fume tubes 30, 34 relative to one another.

The method 150 may further include a step of emitting gas proximate the fume tube assembly 26. As explained above, the gas may be emitted proximate the fume tube assembly 26 through any one of the gas emitting regions 22 (e.g., inner shield $N_2$, outershield $O_2$ and/or the $CH_4$ and $O_2$ premix). The method 150 may further include a step of increasing a flow rate of the emitted gas after adjusting the effective diameter of the aperture 38. As the adjustment of the effective diameter of the aperture 38 allows a greater amount of Siltet and/or OMCTS and $O_2$ to be emitted from the fume tube assembly 26, a corresponding increase in the amount of gas emitted from the emitting regions 22 may be increased to decrease turbulence and homogenize the spray of silica particles. The method 150 may further include a step of decoupling a tapered region (e.g., the second tapered region 34C) of the second fume tube 34 with a tapered region (e.g., the first tapered region 30C) of the first fume tube 30. As explained above, decoupling of the first and second tapered regions 30C, 34C increases the effective diameter of the aperture 38 and allows a greater OMCTS and $O_2$ flow through the fume tube assembly 26. The method 150 may also include a step of moving the second fume tube 34 and the third fume tube 140 within the first fume tube 30. As explained above, moving of the second and third fume tubes 34, 140 within the first fume tube 30 alters the effective diameter of the aperture 38 such that an increased OMCTS and $O_2$ flow may pass through the fume tube assembly 26 without added turbulence.

Use of the present disclosure may offer a variety of advantages. First, altering of the effective diameter of the aperture 38 allow for the burner 10 to provide a variable spray size of silica particles. The variable nature of the spray size allows the burner 10 to provide increased capture efficiency by producing a spray size that is based on the current size and/or diameter of the soot blank 58 of the optical fiber preform 50. Increase of the capture efficiency of the burner 10 may aid in cost savings for the production of silica soot. Second, as the effective diameter of the aperture 38 may be variably adjusted, a laydown rate, or rate of deposition of the silica soot on the optical fiber preform 50 may be increased. Third, as the disclosed fume tube assembly 26 is capable of adjusting the effective diameter of the aperture 38 dynamically while in operation, the burner 10 may not need to be shut down in order to increase laydown rate or change the spray size of the silica soot particles.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A burner, comprising:
  a back block;
  a face block defining a plurality of gas emitting regions;
  a fume tube assembly extending through and separate from the face block and surrounded by the gas emitting regions, wherein the fume tube assembly comprises:
    a first fume tube coupled to the face block;
    a second fume tube positioned within the first fume tube; and
    an aperture defined at an end of the fume tube assembly; and
  an actuator coupled with the second fume tube and configured to move the second fume tube within the first fume tube to adjust an effective diameter of the aperture.

2. The burner of claim 1, wherein an exterior surface of the second fume tube is slidably coupled to an inner surface of the first fume tube.

3. The burner of claim 1, further comprising:
  a third fume tube slidably coupled with the second fume tube.

4. The burner of claim 3, wherein the actuator is further configured to move the third tube relative to the second fume tube.

5. The burner of claim 1, wherein an end of the second tube is positioned from about 2 mm to about 10 mm inward from the aperture.

6. The burner of claim 1, wherein an inside diameter of the first fume tube is from about 1 mm and about 4 mm.

7. The burner of claim 1, wherein an inside diameter of the second fume tube is from about 2.0 mm to about to 2.8 mm.

8. A burner, comprising:
  a face block defining a plurality of gas emitting regions;
  a fume tube assembly extending through and separate from the face block and surrounded by the gas emitting regions, wherein the fume tube assembly comprises:
    a first fume tube;
    a second fume tube movably positioned within the first tube and defining an exterior surface, wherein the exterior surface is tapered; and
    an aperture defined at an end of the fume tube assembly; and
  an actuator coupled with the second fume tube and configured to move the second fume tube within the first fume tube to variably adjust an effective diameter of the aperture.

9. The burner of claim 8, wherein a gap is defined between the second fume tube and the first fume tube.

10. The burner of claim 8, wherein the actuator is further configured to move the second tube through the aperture.

11. The burner of claim 8, wherein the actuator is configured to move the second fume tube coaxial relative to the first fume tube.

12. The burner of claim 8, wherein the first fume tube is tapered proximate the aperture.

13. The burner of claim 8, wherein an exterior diameter of second tube is approximately equal to an inside diameter of the first fume tube.

* * * * *